Figure 1:
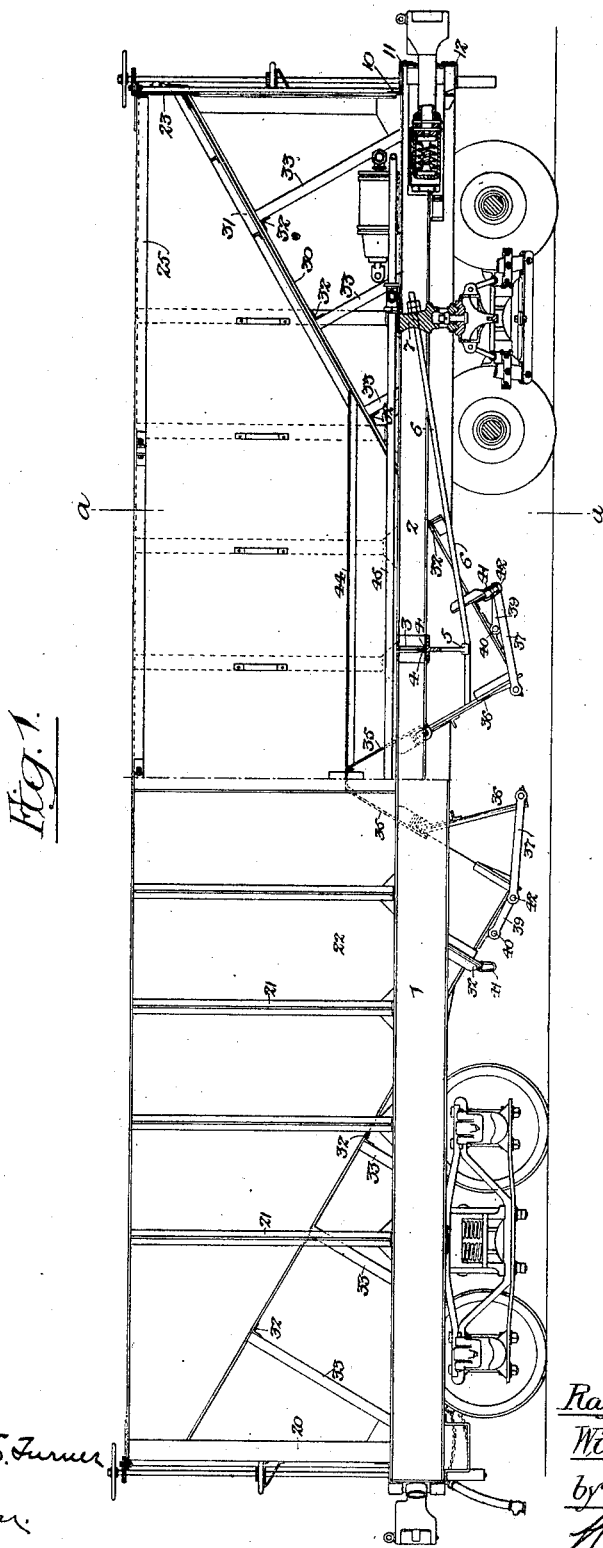

No. 707,416. Patented Aug. 19, 1902.
R. H. HORNBROOK & W. H. WOODCOCK.
METALLIC RAILWAY CAR.
(Application filed Oct. 16, 1901.)
(No Model.) 5 Sheets—Sheet 1.

Witnesses:-
Hamilton D. Turner
Chas W. Cox

Inventors:
Raymond H. Hornbrook
William H. Woodcock
by his Attorneys

No. 707,416. Patented Aug. 19, 1902.
R. H. HORNBROOK & W. H. WOODCOCK.
METALLIC RAILWAY CAR.
(Application filed Oct. 16, 1901.)
(No Model.) 5 Sheets—Sheet 2.
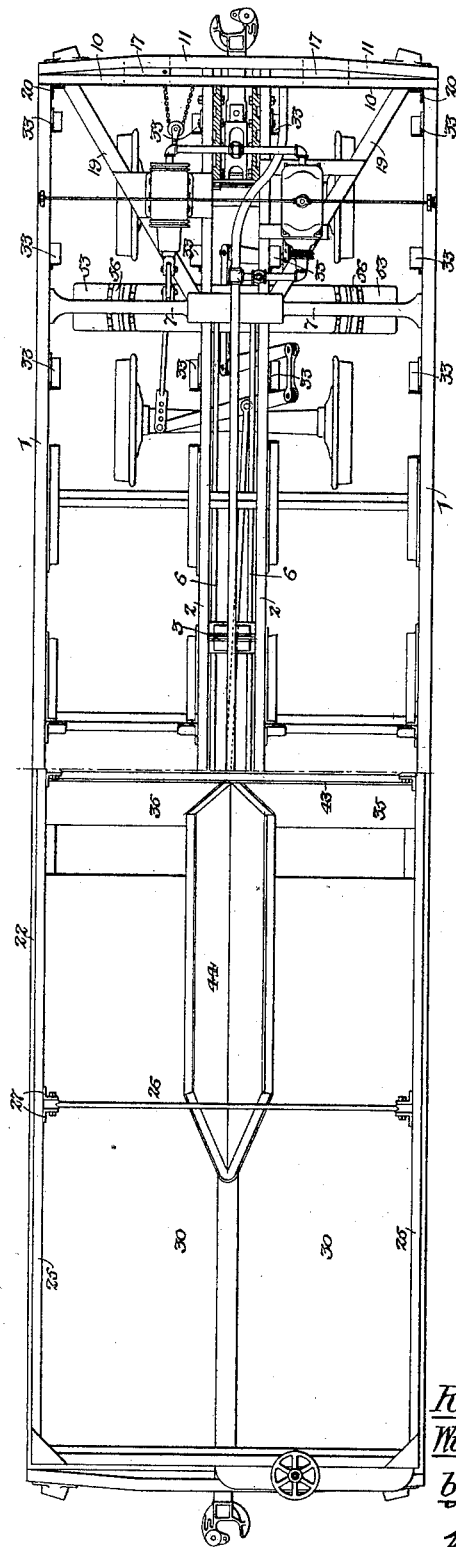

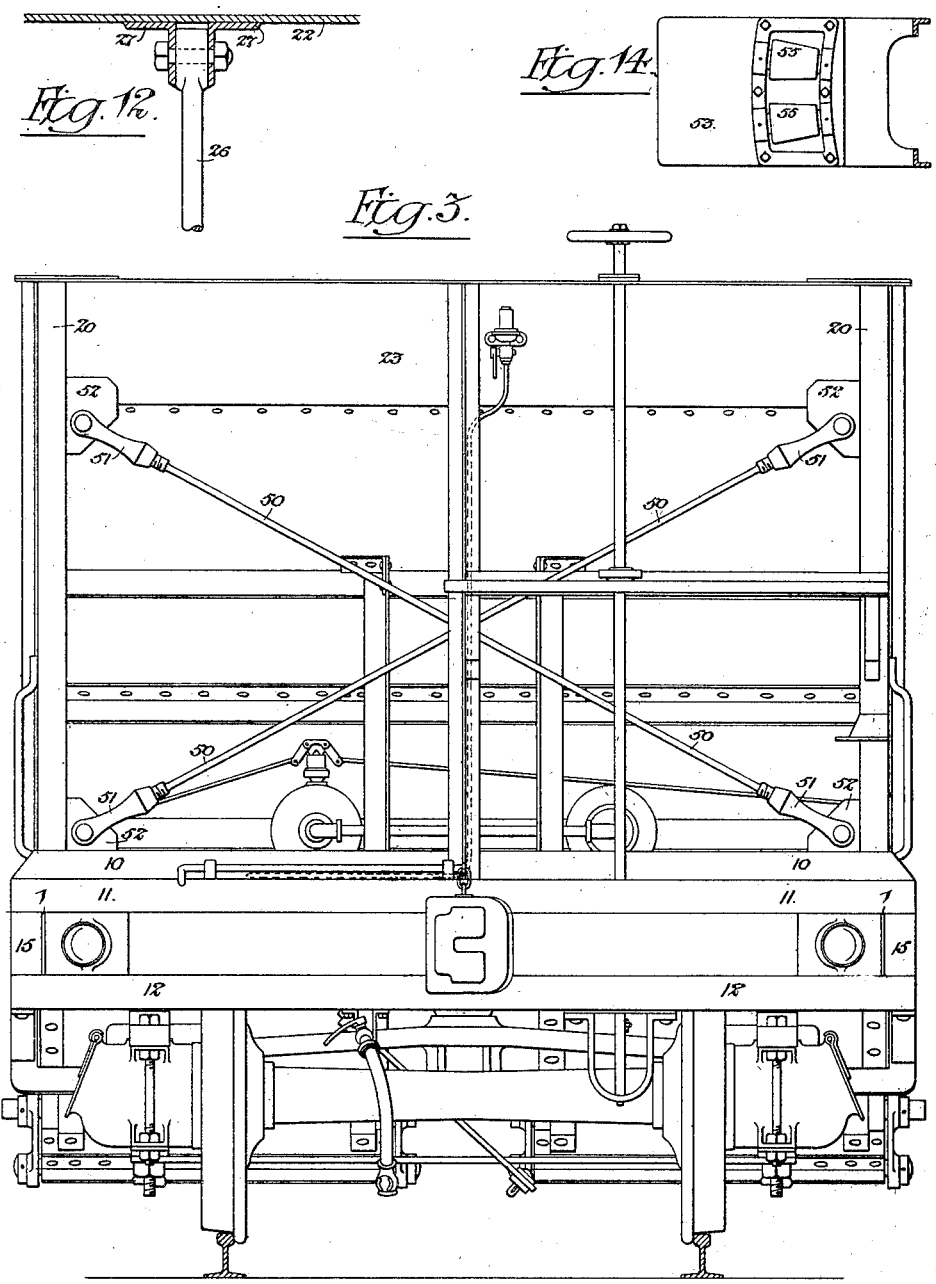

No. 707,416. Patented Aug. 19, 1902.
R. H. HORNBROOK & W. H. WOODCOCK.
METALLIC RAILWAY CAR.
(Application filed Oct. 16, 1901.)
(No Model.) 5 Sheets—Sheet 4.
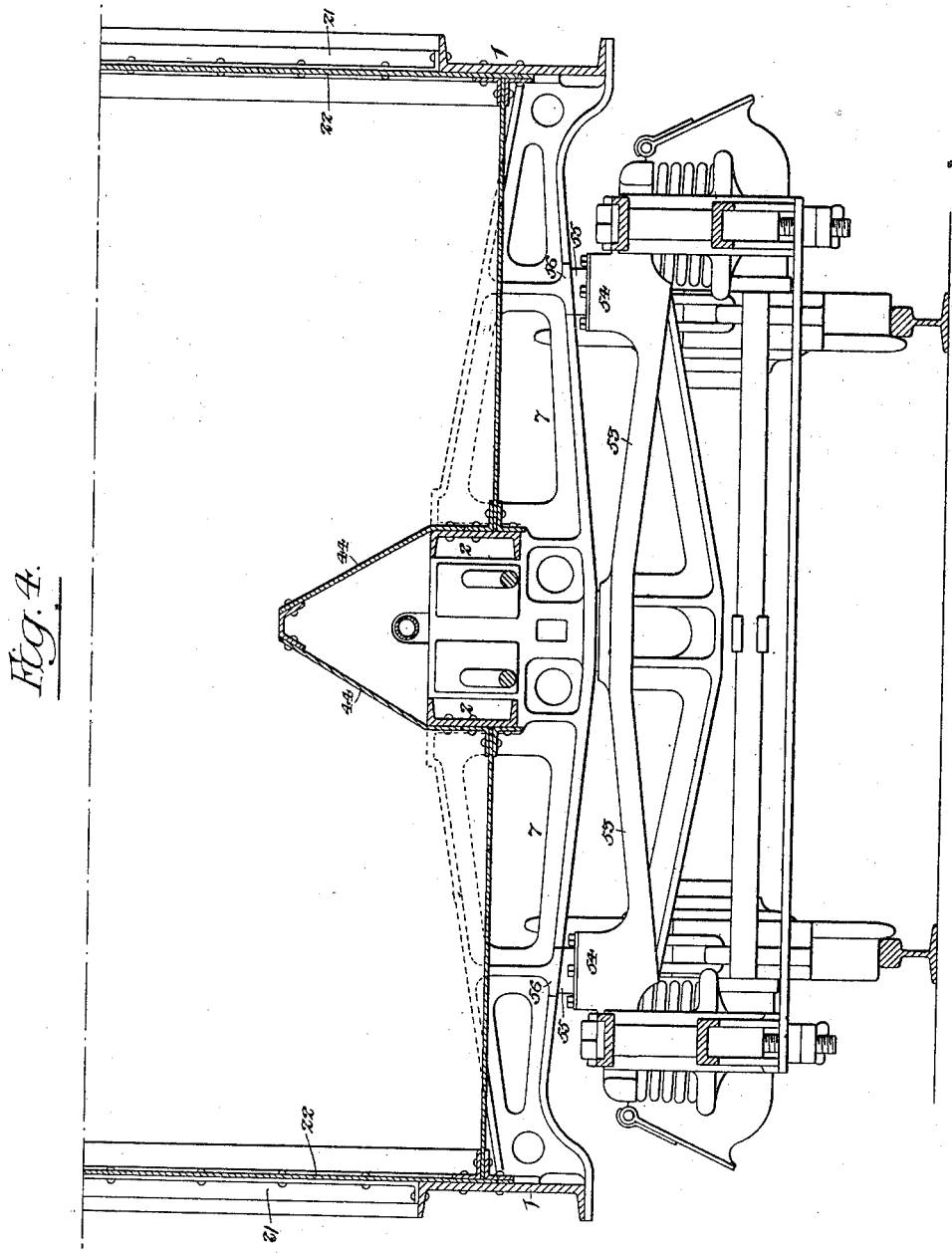
Witnesses:-
Inventors:-
Raymond H. Hornbrook,
William H. Woodcock,
by their Attorneys;

No. 707,416. Patented Aug. 19, 1902.
R. H. HORNBROOK & W. H. WOODCOCK.
METALLIC RAILWAY CAR.
(Application filed Oct. 16, 1901.)
(No Model.) 5 Sheets—Sheet 5.
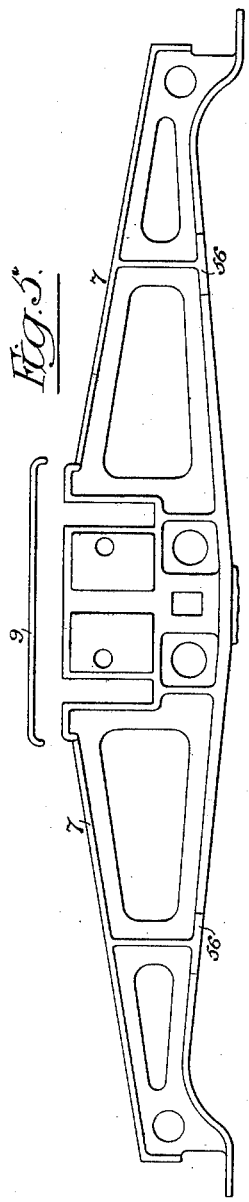
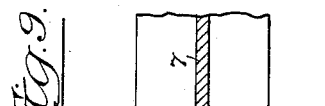
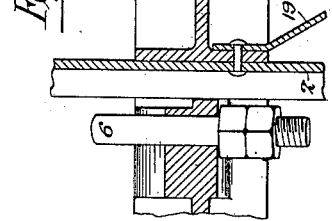
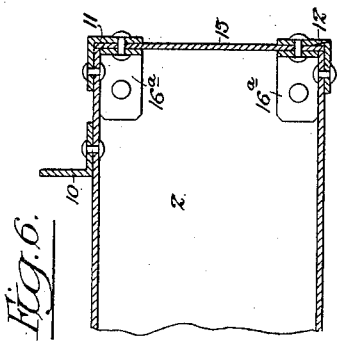
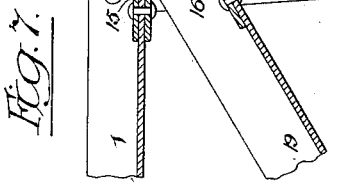
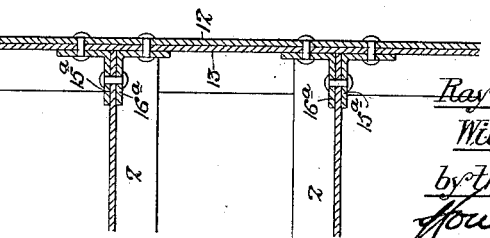
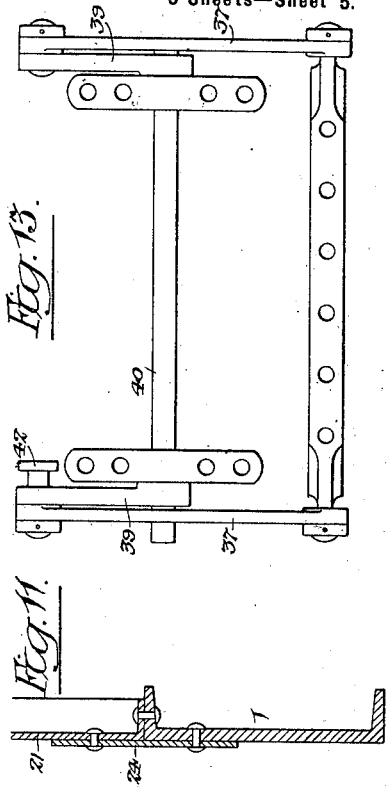
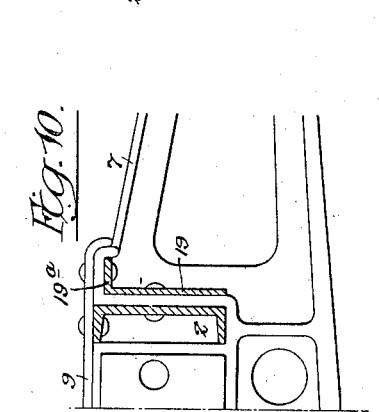
Witnesses:-
Inventors:-
Raymond H. Hornbrook,
William H. Woodcock,
by their Attorneys:-

UNITED STATES PATENT OFFICE.

RAYMOND H. HORNBROOK, OF PHILADELPHIA, PENNSYLVANIA, AND WILLIAM H. WOODCOCK, OF CANTON, OHIO.

METALLIC RAILWAY-CAR.

SPECIFICATION forming part of Letters Patent No. 707,416, dated August 19, 1902.

Application filed October 16, 1901. Serial No. 78,885. (No model.)

*To all whom it may concern:*

Be it known that we, RAYMOND H. HORNBROOK, a resident of Philadelphia, Pennsylvania, and WILLIAM H. WOODCOCK, a resident of Canton, Ohio, subjects of the King of Great Britain and Ireland, have invented certain Improvements in Metallic Railway-Cars, of which the following is a specification.

One object of our invention is to so provide a metallic railway-car having the maximum of strength and carrying capacity in proportion to weight, further objects being to simplify and cheapen the construction of the car by using in such construction mainly rolled shapes and plates, and to provide for a more direct and effective application of the draft mechanism, train-pipes, and braking mechanism than is usually permitted in metallic cars.

In the accompanying drawings we have shown our invention as applied to a hopper-car, Figure 1 being a view, partly in side elevation and partly in longitudinal section, of said car; Fig. 2, a top or plan view with a portion of the car-body removed; Fig. 3, an end view of the car on a larger scale; Fig. 4, a transverse section, on a still larger scale, of part of the car on the line *a a*, Fig. 1; and Figs. 5 to 14, detached views, on an enlarged scale, illustrating features of construction not shown with sufficient clearness in the general views.

The opposite side sills of the car-frame are represented at 1 and the center sill at 2, each of the side sills consisting of a channel-bar with vertical web and horizontal flanges and the center sill consisting of a pair of such bars with their flanges facing each other, said bars being provided at points some distance from the longitudinal center of the car with transverse brace or separator plates 3, secured, by means of suitable angles, to the sills and provided at the bottom with other angles 4, to which are secured depending struts 5, which serve as bearings for truss-rods 6, the opposite ends of which pass through openings in the body-bolsters 7 of the car-frame and are provided with nuts bearing against said body-bolsters, so as to impart the proper degree of tension to said truss-bars. The body-bolsters are by preference thickened at the points where the truss-rods pass through the same in order to increase their strength at these points, and each of said bolsters is recessed for the reception of the bars 2 of the center sill, so that the top of said sill is flush with the top of the bolster, a cap-plate 9, Fig. 5, being secured to the top flanges of the bars 2 and also to the top flanges of the bolster, and the webs of the bars being also riveted to vertical flanges of the bolster, so as to secure said bolster and the center sill firmly together at their meeting-points. The ends of the body-bolsters are stepped, as shown in Fig. 5, so as to form seats for the reception of the lower portions of the side sills 1, the webs and flanges of which are firmly riveted to vertical and horizontal flanges of the bolster. The channel-bars constituting the center sill of the car-frame are less in depth than the side sills, the trussing of the central sill permitting of its being made lighter than the side sills, so that it occupies less space vertically at the center of the car than it would if the bars 2 were as deep as the side sills, thus providing more room for the braking mechanism and other gear usually disposed beneath the car-body.

The end sills of the car-body are composed of upper inner and outer angle-bars 10 and 11, a lower angle-bar 12, and an end plate 13, (see Fig. 6,) the upper inner angle-bar 10 being straight, but the upper outer angle-bar 11 and the lower angle-bar 12 being slightly curved or bent, so as to impart a slightly-rounded shape to the end of the sill, as shown in Fig. 2. All of the bars are riveted to the horizontal flanges of the center and side sills, where they meet or cross the same, as shown in Fig. 6, and the upper and lower outer angle-bars 11 and 12 and end plate 13 are connected to the vertical webs of the side sills by angle-bars 15 and channel-bars 16, Fig. 7, and to the vertical webs of the center sill by angle-bars $15^a$ and $16^a$, Fig. 8, the horizontal flanges of the upper angle-bars 10 and 11 being also connected to separator-plates 17, so as to form a strong and rigidly-braced structure. At each corner of the car-frame are also diagonal braces 19, which extend from said corners to the body-bolsters at the points where the same join the center sill, these diagonal braces being connected to the side and end sills by the channel-bars 16 and being also bolted at their inner ends to the bars of the center sill and having horizontal flanges 19ª bolted to flanges of the body-bolster, as shown in Figs. 9 and 10.

The draft mechanism of the car passes between the upper and lower angle-bars 11 and 12 of the end sill and through an opening of the end plate 13 and is contained between the opposite bars of the center sill, so that the draft is imparted to the car in direct line with the sills instead of above or below the same, and hence more effectively than with either of the latter arrangements.

The upright frame of the car is composed of corner-posts 20 and upright side stakes 21, the corner-posts consisting of angle-bars riveted at their lower ends to the angle-bars 10 of the end sills and also to the webs of the side sills, and the upper portions of these corner-posts being also riveted to the side plates 22 and end plates 23 of the car-body. The upright stakes 21 are composed of T-bars having their flanges riveted to the side plates of the car-body and bent at their lower ends, so as to be riveted to the upper horizontal flanges of the side sills, as shown in Fig. 11, plates 24 also serving to secure the side stakes to the vertical web of the side sills at points where the side plates of the car-body do not extend down to said side sills.

The top of the car-body is stiffened and strengthened by an angle-bar 25, which extends around the entire body of the car and is riveted to the sides and ends of the same and also to the upper portions of the vertical side and corner posts, the upper portion of the car having transverse braces consisting of rods 26, having end eyes, which are secured by transverse bolts and nuts to angle-plates 27, riveted to the side structure of the car-body, as shown in Fig. 12. The transverse bolts are cheaper than the angle-bars sometimes employed as transverse braces for the top of the car and permit of the use of bolt-and-nut connections at the ends, so that these transverse braces can be removed and replaced with facility.

The inclined bottom 30 at the ends of the car are connected to the sides 22 by internal angle-bars 31 and are braced and stiffened by transverse angle-bars 32 and supported by inclined struts 33, composed of angle-bars extending from the inclined bottom 30 to the side and center sills 1 and 2 and riveted to both of these sills as well as to the transverse angle-bars 32, thus providing a firm and rigid support for these portions of the car.

The reversely-inclined hopper-bottoms 35 are secured to the sides of the car by internal angle-bars and each of the same is provided with a swinging door 36, connected by links 37 to crank-arms 39 on a rock-shaft 40, mounted in suitable bearings on the inclined bottom 30 of the car, a loop 41, suspended from one of the transverse braces 32 of the car-bottom, serving when the door is closed to engage with the projecting portion of a pin 42, Fig. 13, whereby one of the links is connected to one of the crank-arms 39, and thereby hold said crank-arm in the elevated position and firmly retain the door, so as to prevent accidental opening of the same by the jarring of the car.

The car is divided into two parts by the central transverse partition 43, Fig. 2, and each portion of the car has a central longitudinal tunnel 44, consisting of plates extending upwardly from the bars 2 of the center sill toward the center of the car, this tunnel serving for the passage of the train-pipe 45 and such other elements of the car equipment as it may be advisable to extend along the center of the car, thus rendering unnecessary the bending of said parts, which is sometimes resorted to in order to clear the depending portion of the hopper.

The corner-posts 20 at the ends of the car are connected by transverse diagonal brace-rods 50, each connected at each end, by means of a clevis 51, to a plate 52, secured to and projecting inwardly from said end post, as shown in Fig. 3.

The body-bolster 7 of the car is provided with the usual central pivotal bearing upon the truck-bolster 53; but each of the side bearings 54 of the truck-bolster is provided with a series of radially-arranged conical rollers 55, (see Fig. 14,) mounted so as to be free to turn on said side bearings 54 and providing an antifriction-support for the side bearings 56 of the body-bolster, so that each body-bolster may have at all times three points of bearing on the truck-bolster without causing excessive friction as the truck-bolster swings, a firm and steady support for the body of the car being thus provided at all times and the central pivotal bearing being relieved from the greater portion of the weight which it is usually compelled to carry. The conical rollers can, if desired, be mounted upon the body-bolster instead of upon the truck-bolster; but the latter construction is preferred. By recessing the body-bolster for the reception of the members of the central sill the whole body of the car is correspondingly lowered, and the center of gravity of the loaded car therefore brought down to such a moderate distance above the track-level as to preclude any risk of derailing, such as is likely to follow when the center of gravity of the car is abnormally high.

The strength of our improved car will be appreciated from the special construction of car framing and body, the side sills and side plates, with the upright side stakes, each constituting a single well-braced girder, the inclined bottoms of the car being rigidly braced to the sills by means of the diagonal struts, the members of the center sill being stiffened longitudinally by the truss-rods and being rigidly braced laterally by the bolsters and separator-plates, and the ends of the sills being of extremely-rigid construction and having their outer corners well stiffened by the diagonal braces leading therefrom to the body-bolsters. Hence the car is designed to withstand without injury the extremely-rough handling which cars of this character are likely to meet with in ordinary railroad practice.

Although we have described our invention as embodied in a hopper-car, it will be evident that many of the features of our invention are applicable as well to other forms of car.

Having thus described our invention, we claim and desire to secure by Letters Patent—

1. A metallic car-frame having longitudinal side sills composed of channel-bars and a center sill composed of channel-bars of less depth than the side sills but provided with longitudinal truss-rods, substantially as specified.

2. The combination of the opposite channel-bars of the center sill, the transverse body-bolsters and longitudinal truss-rods bearing upon struts depending from the sill, said truss-rods passing through the body-bolsters and having nuts bearing thereupon, substantially as specified.

3. The combination of the opposite channel-bars, of the center sill with the body-bolsters, separator-plates interposed between and secured to the bars of the center sill, struts secured to and depending from said separator-plates, and longitudinal truss-rods bearing upon said struts and passing through the body-bolsters, substantially as specified.

4. The combination in a metallic car-frame, of side and center sills, with an end sill having inner and outer angle-bars secured to said center and side sills, substantially as specified.

5. The combination in a metallic car-frame, of side and center sills, with an end sill having inner and outer angle-bars at the top, and an outer angle-bar at the bottom, all of said bars being secured to the center and side sills, substantially as specified.

6. The combination in a metallic car-frame, of center and side sills with an end sill having inner and outer angle-bars at the top, an outer angle-bar at the bottom, and a transverse plate extending from top to bottom, said bars and plate being secured to the center and side sills, substantially as specified.

7. The combination in a metallic car-frame of the side sills and the end sills with diagonal braces extending from the corners of the frame and having bent ends connected to the said side sills, and a channel-bar connected to the brace and to both side and end sills, substantially as specified.

8. The combination in a metallic car-frame of the side sills, the center sills, the end sills, and the transverse body-bolster with diagonal braces extending from the corners of the frame formed by the junction of the end sills and the side sills to the angles formed by the junction of the center sill and body-bolsters, said diagonal braces presenting horizontal flanges secured to the flanges on the bolster and vertical flanges secured to the bolster and center sills, substantially as specified.

9. The combination of the upright sides of a metallic car with the transverse top braces consisting of rods having end eyes, angle-bars secured to the inner sides of the car and serving as vertical braces therefor, and bolts whereby the eyes at the ends of the transverse rods are secured to the said angle-bars, substantially as specified.

10. The combination of the end sills and upright corner-posts of a metallic car-frame, plates secured to and projecting inwardly from said corner-posts, and stay-rods extending diagonally from post to post and having shackles whereby they are secured to said inwardly-projecting plates, substantially as specified.

In testimony whereof we have signed our names to this specification in the presence of two subscribing witnesses.

RAYMOND H. HORNBROOK.
WILLIAM H. WOODCOCK.

Witnesses to the signature of Hornbrook:
  F. E. BECHTOLD,
  WILL. A. BARR.

Witnesses to the signature of Woodcock:
  CALVIN SEEMANN,
  ETHEL FOOS.